US008473081B2

(12) United States Patent
Usher et al.

(10) Patent No.: US 8,473,081 B2
(45) Date of Patent: Jun. 25, 2013

(54) METHOD AND SYSTEM FOR EVENT REMINDER USING AN EARPIECE

(75) Inventors: John Usher, Boca Raton, FL (US); Steven Goldstein, Delray Beach, FL (US)

(73) Assignee: Personics Holdings, Inc., Boca Raton, FL (US)

( * ) Notice: Subject to any disclaimer, the term of this patent is extended or adjusted under 35 U.S.C. 154(b) by 1169 days.

(21) Appl. No.: 12/343,291

(22) Filed: Dec. 23, 2008

(65) Prior Publication Data

US 2009/0238386 A1 Sep. 24, 2009

Related U.S. Application Data

(60) Provisional application No. 61/016,565, filed on Dec. 25, 2007.

(51) Int. Cl.
*G06F 17/00* (2006.01)

(52) U.S. Cl.
USPC .......... 700/94

(58) Field of Classification Search
USPC .......... 700/94
See application file for complete search history.

(56) References Cited

U.S. PATENT DOCUMENTS 5,426,719 A 6/1995 Franks et al.
5,963,626 A 10/1999 Nabkel
6,108,630 A 8/2000 Kuechler et al.
6,647,368 B2 11/2003 Nemirovski
6,993,121 B2 1/2006 Bossemeyer, Jr. et al.
7,103,599 B2 9/2006 Buford et al.
7,110,562 B1 9/2006 Feeley
7,263,178 B1 8/2007 Brothers et al.
7,310,513 B2 12/2007 Bulthuis et al.
7,697,922 B2 4/2010 McQuaide, Jr. et al.
2004/0125142 A1* 7/2004 Mock et al. .......... 345/765
2005/0058313 A1* 3/2005 Victorian et al. .......... 381/315
2005/0153729 A1 7/2005 Logan et al.
2006/0045278 A1* 3/2006 Aceti .......... 381/23.1
2007/0291953 A1 12/2007 Ngia et al.
2009/0070708 A1* 3/2009 Finkelstein .......... 715/789

OTHER PUBLICATIONS

Office Action for U.S. Appl. No. 12/343,277, filed Dec. 23, 2008, mailed Oct. 6, 2011.

* cited by examiner

*Primary Examiner* — Joseph Saunders, Jr.
(74) *Attorney, Agent, or Firm* — RatnerPrestia

(57) ABSTRACT

A method for administering an audio message to a user of an earpiece can include receiving event information from a paired communication device, updating a personal event calendar by ordering event information to generate a first event list, generating a modified event list by grouping events in the first event list according to acceptance criteria based on event priority of event types, and generating an audio token for collective events in the modified event list for audible delivery to the ear canal. Events can be ordered by event name, event location, event data, event importance, event invitees, or event category.

29 Claims, 9 Drawing Sheets

1200

METHOD AND SYSTEM FOR EVENT REMINDER USING AN EARPIECE

CROSS REFERENCE TO RELATED APPLICATIONS

This Application is a Non-Provisional and claims the priority benefit of Provisional Application No. 61/016,565 filed on Dec. 25, 2007, the entire disclosure of which is incorporated herein by reference.

This Application also claims the priority benefit of Non-Provisional application Ser. No. 12/343,277 filed together with the immediate application, that application claiming priority from Provisional Application No. 61/016,564 also filed on Dec. 25, 2007, the entire disclosure of which is incorporated herein by reference.

FIELD

The present invention relates to an earpiece, and more particularly, though not exclusively, to a method and system for an event reminder using an earpiece.

BACKGROUND

Portable communication devices that can send and receive text messages are ubiquitous. Short Message Service and email messages can be delivered to various communication devices such as cell phones and music media devices. An incoming text message delivered to the communication device is generally read by the user on a graphical display of the communication device.

An earpiece however does not provide a convenient means for organizing content within text messages. A user wearing an earpiece that is communicatively coupled to the communication device generally relies on the communication device to process text messages. The user reverts to the communication device display to read the message in a text form. Such a procedure can be difficult and sometimes dangerous for a user since they need to divert their visual attention to the device.

SUMMARY

In a first embodiment, an earpiece can include an Ambient Sound Microphone (ASM) to capture ambient sound, an Ear Canal Receiver (ECR) to deliver audio to an ear canal, an Ear Canal Microphone (ECM) configured to monitor a sound pressure level (SPL) within the ear canal, a transceiver to receive and transmit event information from a paired communication device, and a processor operatively coupled to the transceiver, ASM, the ECR, and the ECM.

The processor can screen event information from text messages according to acceptance criteria, produce a modified event list in response to the screening, and audibly inform a user wearing the earpiece of the modified event information. The processor can update a personal event calendar and generate a first event list from the event information received from paired communication device. The event information can include a data field that is an event name, an event location, an event importance, an event invitation list, and an event category. The processor can convert the first event list to the modified event list by grouping events, for example, according to a geographic location at which the event is planned, or an event category. The processor can then generate an audio token for events in the modified event list for audible delivery to the ear canal.

In a second embodiment, a method for administering an audio message to a user of an earpiece can include the steps of receiving event information from a paired communication device, screening the event information according to acceptance criteria, producing a modified event list in response to the screening, and audibly informing the user of the modified event information. The method can include updating a personal event calendar to generate a first event list from received events, and generating a modified event list according to acceptance criteria based on event priority of event types. Events can be ordered by importance, a time at which the event is planned to occur, according to an event category, by event name, event location, or event invites. Events can be removed that have an event importance lower than a predetermined criteria threshold until a total number of remaining events is equal to a predetermined threshold.

In a third embodiment, a method for administering an audio message to a user of an earpiece can include the steps of receiving event information from a paired communication device, updating a personal event calendar by ordering event information to generate a first event list, generating a modified event list by grouping events in the first event list according to acceptance criteria based on event priority of event types, and generating an audio token for collective events in the modified event list for audible delivery to the ear canal. The method can include reducing a volume of audio content generated by the ECR to a predetermined level for allowing the audio token to be heard clearly, and increasing a volume of the audio token in accordance with an importance or priority level of the event information associated with the audio token.

DETAILED DESCRIPTION

Figure 1:
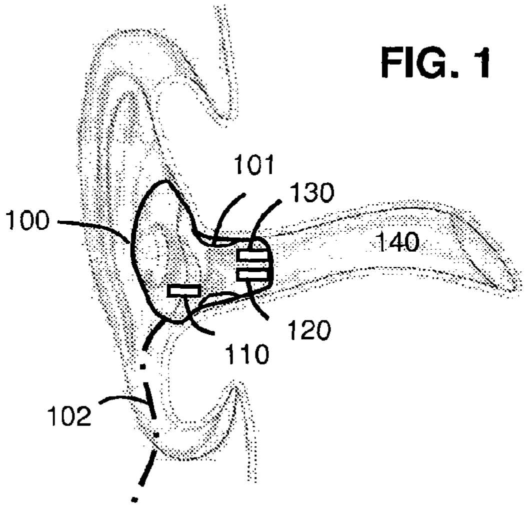
FIG. 1 is a pictorial diagram of an earpiece in accordance with an exemplary embodiment.

The following description of at least one exemplary embodiment is merely illustrative in nature and is in no way intended to limit the invention, its application, or uses. Similar reference numerals and letters refer to similar items in the following figures, and thus once an item is defined in one figure, it may not be discussed for following figures.

At least one exemplary embodiment of the invention is directed to an earpiece that groups common event information from multiple text messages from different sources and generates an audio token that collectively identifies and audibly delivers the event information to a user of the earpiece. This reduces the number of audible messages that the user must listen to since each audible token is collectively related to the same event. For instance, event invitations to a same event celebration at a same location can be grouped and collectively sent as a single audio token. Thus, instead of the user listening to every text message from invitees the user can hear a collective audio token identifying all of the participants attending the event and can respond singly to the group.

Reference is made to FIG. 1 in which an earpiece device, generally indicated as earpiece 100, is constructed in accordance with at least one exemplary embodiment of the invention. Earpiece 100 includes an Ambient Sound Microphone (ASM) 110 to capture ambient sound, an Ear Canal Receiver (ECR) 120 to deliver audio to an ear canal 140, and an ear canal microphone (ECM) 130 to assess a sound exposure level within the ear canal 140. Audio content can be delivered via a wired connection 102 or via wireless communications. The earpiece 100 can partially or fully occlude the ear canal 140 by way of the sealing material 101 to provide various degrees of acoustic isolation.

The earpiece 100 can actively monitor a sound pressure level both inside and outside an ear canal 140 and enhance spatial and timbral sound quality to ensure safe reproduction levels. The earpiece 100 in various embodiments can provide listening tests, filter sounds in the environment, monitor warning sounds in the environment, present notices based on identified warning sounds, adjust audio content levels with respect to ambient sound levels, and filter sound in accordance with a Personalized Hearing Level (PHL). The earpiece 100 is suitable for use with users having healthy or abnormal auditory functioning. The earpiece 100 can be an in the ear earpiece, behind the ear earpiece, receiver in the ear, open-fit device, or any other suitable earpiece type. Accordingly, the earpiece 100 can be partially or fully occluded in the ear canal.

Figure 2:
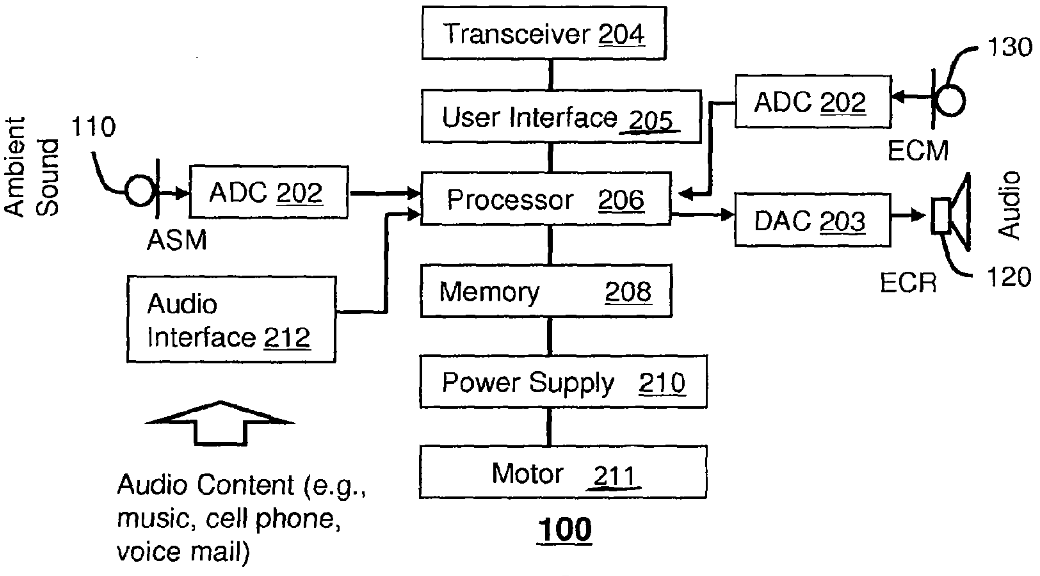
FIG. 2 is a block diagram of the earpiece in accordance with an exemplary embodiment.

Referring to FIG. 2, a block diagram of the earpiece 100 in accordance with an exemplary embodiment is shown. As illustrated, the earpiece 100 can further include a processor 206 operatively coupled to the ASM 110, ECR 120, ECM 130, and user interface 205 via one or more Analog to Digital Converters (ADC) 202 and Digital to Analog Converters (DAC) 203. The processor 206 can produce audio from at least in part the ambient sound captured by the ASM 110, and actively monitor the sound exposure level inside the ear canal 140. The processor responsive to monitoring the sound exposure level can adjust the audio in the ear canal 140 to within a safe and subjectively optimized listening level range. The processor 206 can utilize computing technologies such as a microprocessor, Application Specific Integrated Chip (ASIC), and/or digital signal processor (DSP) with associated storage memory 208 such as Flash, ROM, RAM, SRAM, DRAM or other like technologies for controlling operations of the earpiece device 100.

The earpiece 100 can further include a transceiver 204 that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver 204 can also provide support for dynamic downloading over-the-air to the earpiece 100. It should be noted also that next generation access technologies can also be applied to the present disclosure.

The earpiece 100 can also include an audio interface 212 operatively coupled to the processor 206 to receive audio content, for example from a media player, and deliver the audio content to the processor 206. The processor 206 responsive to detecting an incoming call or an audio message can adjust the audio content and the warning sounds delivered to the ear canal. The processor 206 can actively monitor the sound exposure level inside the ear canal and adjust the audio to within a safe and subjectively optimized listening level range. The processor 206 can utilize computing technologies such as a microprocessor, Application Specific Integrated Chip (ASIC), and/or digital signal processor (DSP) with associated storage memory 208 such as Flash, ROM, RAM, SRAM, DRAM or other like technologies for controlling operations of the earpiece device 100.

The power supply 210 can utilize common power management technologies such as replaceable batteries, supply regulation technologies, and charging system technologies for supplying energy to the components of the earpiece 100 and to facilitate portable applications. The motor 211 can be a single supply motor driver coupled to the power supply 210 to improve sensory input via haptic vibration. As an example, the processor 206 can direct the motor 211 to vibrate responsive to an action, such as a detection of an incoming voice call.

The earpiece 100 can further represent a single operational device or a family of devices configured in a master-slave arrangement, for example, a mobile device and an earpiece. In the latter embodiment, the components of the earpiece 100 can be reused in different form factors for the master and slave devices.

Figure 3:
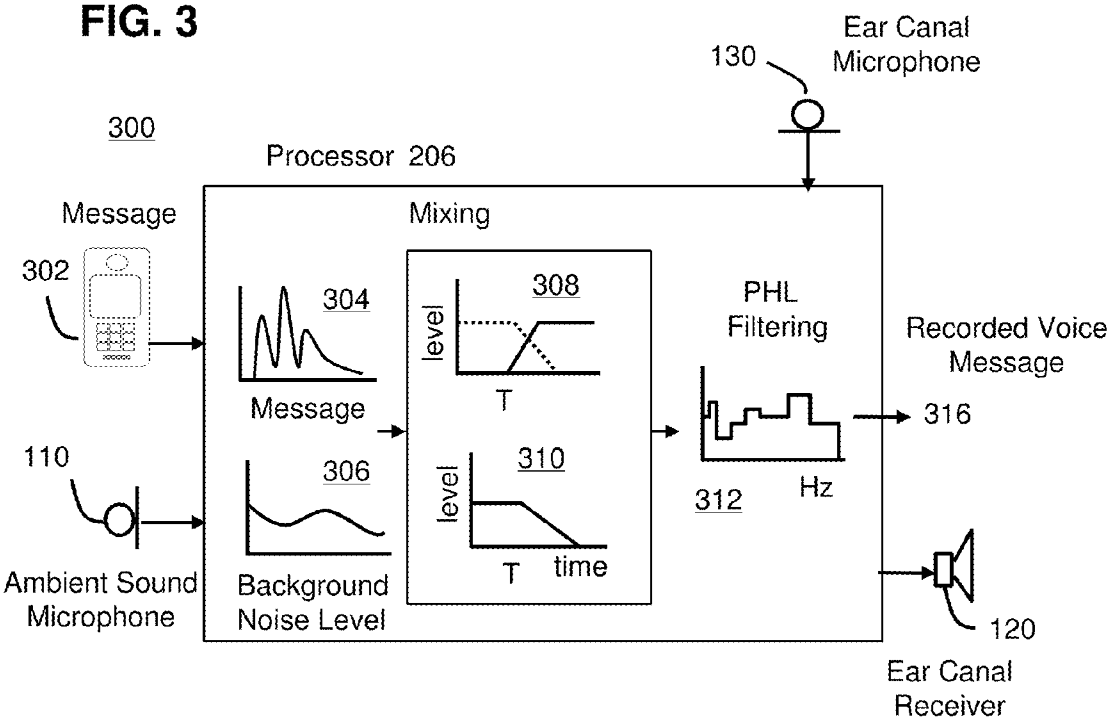
FIG. 3 is a pictorial diagram illustrating a mixed signal output in accordance with an exemplary embodiment.

FIG. 3 is a pictorial diagram 300 illustrating a mixed signal output in accordance with an exemplary embodiment. In general, a signal from an external source such as communication device 302 can be mixed with ambient sound microphone 110 and ear canal microphone 130. More than one external source can be provided such as a multimedia player, computer, radio, and television to name but a few. The mixing of different signals can be varied depending on the situation in which the device is used. Several non-limiting examples will be provided hereinbelow.

An incoming text message is detected by processor 206. In a non-limiting example, processor 206 indicates to the user that a message is present via a sound, physical, or visual queue. Processor 206 can detect user activity and can implement user selected options to immediately provide the message or delay notification for a more appropriate time. For example, the earpiece couples via a wired or wireless connection to other devices located in different physical areas. In particular, one area can be a "do not disturb" area for receiving messages. Processor 206 can delay messages or have a priority (for allowing notification) depending on a determined location. Thus, location is a trigger for determining when a message is delivered.

In another non-limiting example, the user can receive the message through the earpiece. Processor 206 converts the text message to audio (text to speech) 304 and the user hears a synthesized voice through receiver 120. The user can respond to the text message in a conventional manner by typing a response to the message. Standard texting can be a default setting where other options are provided by user selection or requested by the earpiece after a predetermined time (after the message has been provided). For example, the user is performing a physical activity such as driving or manual labor and wants to review and respond to emails while the activity is on-going. In the example of driving, text messaging back through a keyboard would produce a hazardous situation for the driver and those around the vehicle since it would defocus concentration from the road and remove physical contact with the steering wheel. Texting while driving is a violation of law in many regions of the world. In at least one exemplary embodiment, a vocal response 316 to the message is recorded and stored in memory. Processor 206 reduces the gain on ambient sound microphone 110 while boosting the gain of ear canal microphone 130. The sound is primarily recorded through ECM 130. The benefit of recording the response using ECM 130 is twofold. First, the background noise level 306 of the recorded voice response 316 is reduced because the ambient sound around the user is not introduced in the response. Also, a more accurate conversion from speech is generated using the signal from ECM 130 because of the consistency and repeatability of receiving the voice signal from the ear canal versus a changing ambient environment.

In one exemplary embodiment, processor 206 reduces a level from ambient sound microphone 110 while correspondingly increasing the level of the ear canal microphone for recording a response. Under high ambient noise levels ASM 110 can provide little to none of the recorded voice signal. Conversely, processor 206 can allow a mixture of the ECM signal and the ASM signal to provide a more realistic sounding signal should the user select that the response be provided as an audio file.

Levels of ASM 110 and ECM 130 are adjusted at time T, the processor 206 upon detecting a vocal response to the text message can decrease the level of ASM 110 as shown in graph 310 and increase the level of ECM 130 as shown in graph 308. Other mixing arrangements are herein contemplated. In general, audio content from communication device 302 or from other devices are muted or decreased in level so as to be inaudible in the recording. Notably, the ramp up and down times of the audio content can also be adjusted based on the priority of the target sound.

Furthermore, the processor 206 can spectrally enhance the audio content in view of one or more factors as shown in graph 312 before providing the signal for recording. For example, the enhancement can improve high frequency content if the signal is principally taken from ECM 130 or to increase intelligibility for coversion to text. In another example, the user could be whispering a response to the text message. Whispering could be done so as not to be disruptive to others around the user or so others in proximity do not hear the response. The timbral balance of the response can be maintained by taking into account level dependent equal loudness curves and other psychoacoustic criteria (e.g., masking). For instance, auditory queues such as whispering can be enhanced based on the spectrum of the sound captured by ASM 110 or ECM 130. Frequency peaks within the whispered response signal can be elevated relative to noise frequency levels and in accordance with the PHL to permit sufficient audibility of the whispered response.

Figure 4:
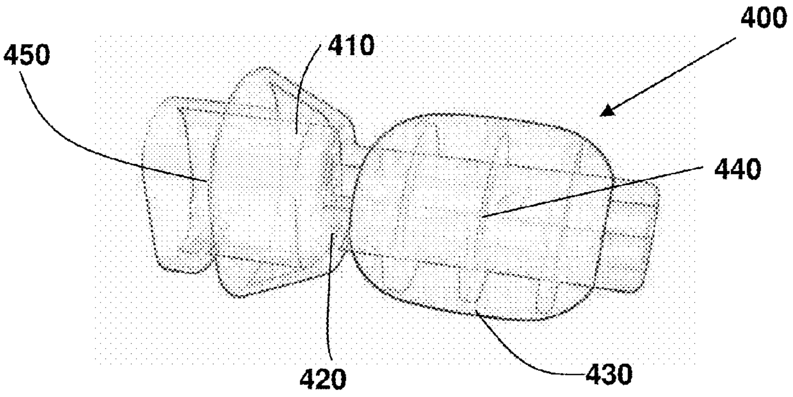
FIG. 4 is an inflatable system for sealing an ear canal in accordance with an exemplary embodiment.

FIG. 4 is an inflatable system 400 for sealing an ear canal in accordance with an exemplary embodiment. Referring to FIG. 1, the earpiece 100 can partially or fully occlude the ear canal 140. In at least one exemplary embodiment, inflatable system 400 is operably configured to earpiece 100 for occluding ear canal 140. Inflatable system 400 comprises an insertion element 420, an expandable element 430, a stop flange 410, and an instrument package 450.

Insertion element 420 is a multi-lumen tube having one or more acoustic channels for providing or receiving sound from the ear canal. Expandable element 430 overlies insertion element 420 for sealing the ear canal. Expandable element 430 can be an inflatable structure such as a balloon. The balloon can be filled with an expanding medium such as gas, liquid, electroactive polymer, or gel that is fed the through a supply tube 440. Supply tube 440 is a path for adding or reducing the medium from expandable element 430. The balloon can comprise an elastic or inelastic material. For example, expandable element 430 comprises urethane, nylon, or silicone. In general, expandable element 430 compresses or is deflated such that it readily fits into an ear canal opening. Inflating expandable element 430 seals the ear canal for attenuating sound from an ambient environment. Expandable element 430 conforms to the shape of the ear canal in a manner that is comfortable for extended periods of earpiece use and provides consistent attenuation from the ambient environment under varying user conditions.

Stop flange 410 limits how far the user of the earpiece can insert insertion element 420 and expandable element 430 into the ear canal. Limiting the range of insertion prevents scratching the ear canal or puncturing the tympanic membrane. In at least one exemplary embodiment, insertion element 420 comprises a flexible material that flexes should it come in contact with the ear canal thereby preventing damage to the ear canal wall. The instrument package 450 is an area of the earpiece for holding additional devices and equipment to support the expansion such as a power supply, leads, gas and/or fluid generation systems.

Figure 5:
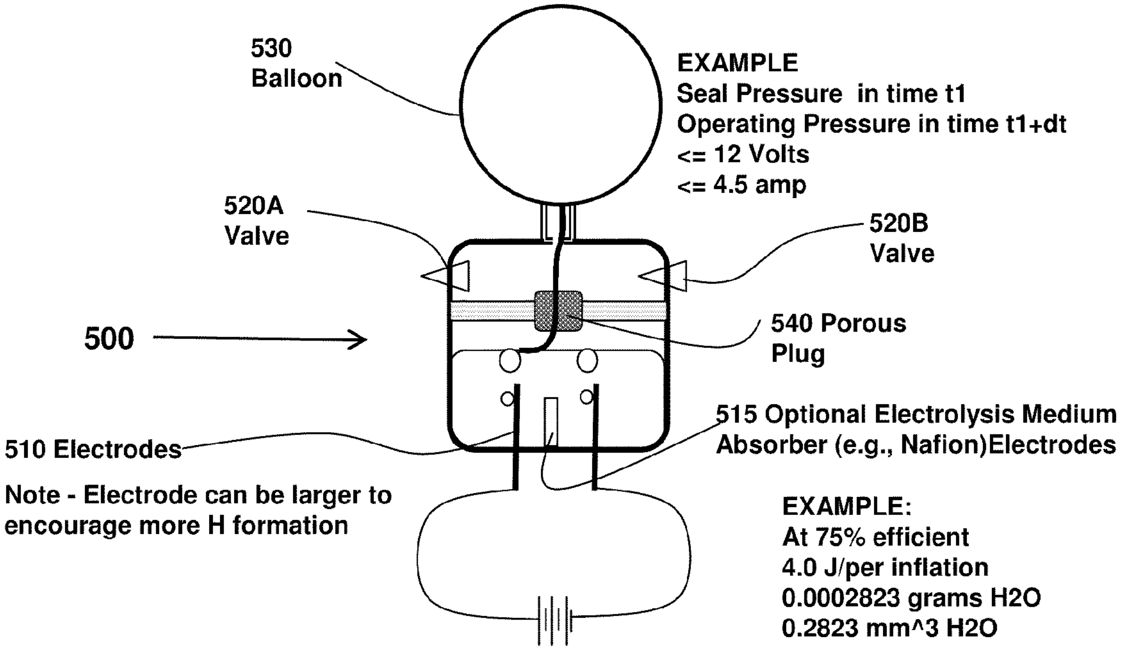
FIG. 5 is an illustration of an inflation device for an expandable element in accordance with an exemplary embodiment.

FIG. 5 is an illustration of an inflation device 500 for an expandable element in accordance with an exemplary embodiment. In the non-limiting example, inflation device 500 is a component of earpiece 100 that inflates a balloon 530 inserted in ear canal 140. Inflation device comprises pressure valve 520A, pressure valve 520B, electrodes 510, a porous plug 540, and optionally a membrane 515.

In at least one exemplary embodiment, inflation device 500 includes a liquid such as $H_2O$ (water) with a salt such as NaCl dissolved therein. For example, NaCl dissolved at a concentration 0.001 mole/liter supports the electrolysis. Electrodes 510 are spaced from one another in the solution. The NaCl allows a current to pass between the electrodes 510 when a voltage is applied across electrodes 510. Electrodes 510 act as if they were essentially in free electrolysis material while at the same time preventing the electrodes from touching. Optional membrane 515 facilitates in reducing a distance between electrodes 510. Reducing the distance between electrodes 510 increases the electric field and hence the current. In at least one exemplary embodiment, membrane 515 is an electrolysis medium absorber such as Nafion.

The electrolysis system shown includes the porous plug 540 that is coupled to a chamber. Gas generated by electrolysis passes through porous plug 540 into a chamber having valves 520A and 520B. The control valves 520A and 520B allow a predetermined gauge pressure value to be reached inside of the chamber (e.g. 50% gauge). The chamber couples to balloon 530. Gas from outside the chamber enters into the chamber if the gauge pressure value drops below the predetermined gauge pressure value thereby regulating the pressure in balloon 530. The gauge pressure in this instance is calculated as the pressure inside the chamber minus the pressure outside the chamber.

Figure 6:
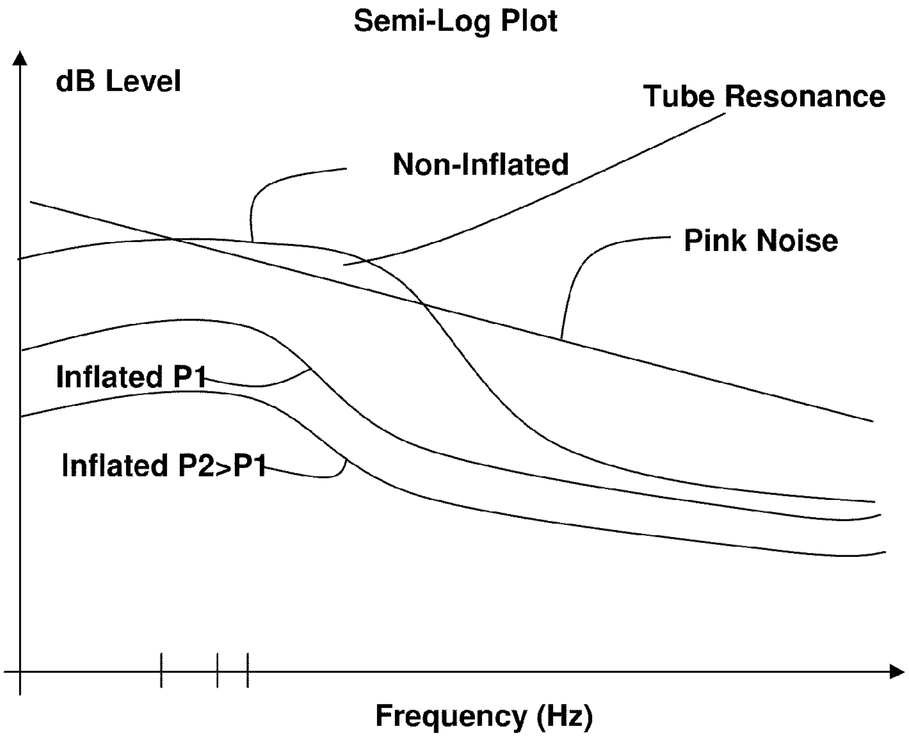
FIG. 6 is an illustration showing attenuation due to occlusion of a balloon in an ear canal at different pressure levels.

FIG. 6 is an illustration showing attenuation due to occlusion of balloon 530 in an ear canal at different pressure levels. Balloon 530 is placed in the cartilaginous region of ear canal 140. A gas or liquid inflating balloon 530 in ear canal 140 applies a pressure on the balloon material pressing the material against the walls of ear canal 140. It has been found that increasing the pressure in balloon 530 correspondingly increases the isolation or attenuation from the ambient environment. Thus, the active system illustrated in FIGS. 4 and 5 allow the attenuation to be varied by controlling the pressure in balloon 530. For example, in a speech to text conversion for responding to a text message the quality of the conversion would be more consistent by detecting the noise level in the ambient space and increasing the pressure of the sealing section (to increase attenuation/reduce background noise) while switching to the ear canal microphone to obtain the response for conversion.

In general, FIG. 6 illustrates sound isolation results (attenuation+reflection) as a function of inflation plotted in semi-log scale. In the example of an earpiece, the balloon isolates the ear canal from the ambient environment (outside the ear). The attenuation result is achieved by providing pink noise in the ambient measured at an ambient side of the balloon and measuring the noise level in the ear canal. The difference in the noise levels is the attenuation provided by the balloon. The plot shows that the attenuation is frequency dependent. Note that the inflation can be varied to obtain a variation in attenuation. Thus, the curve related to pressure P2 has a greater attenuation across the frequency band than inflated pressure P1 where P2>P1.

The inflation can be either a liquid (e.g. water), a gas (e.g. $H_2O$ vapor, $H_2$, $O_2$ gas) or a combination of both. In accordance with at least one exemplary embodiment, the sound isolation level can be controlled by increasing the pressure of the inflatable system in the ear canal above a particular seal pressure value. The seal pressure value is the pressure at which the inflatable system has conformed to the inside of the orifice such that a drop between the sound pressure level on one side of the inflatable system Is different from the sound pressure level on the opposite side of the inflatable system by a drop value over a short period of time. For example, when a sudden (e.g. 1 second) drop (e.g. 3 dB) occurs by a particular pressure seal level (e.g. 2 bar).

Figure 7:
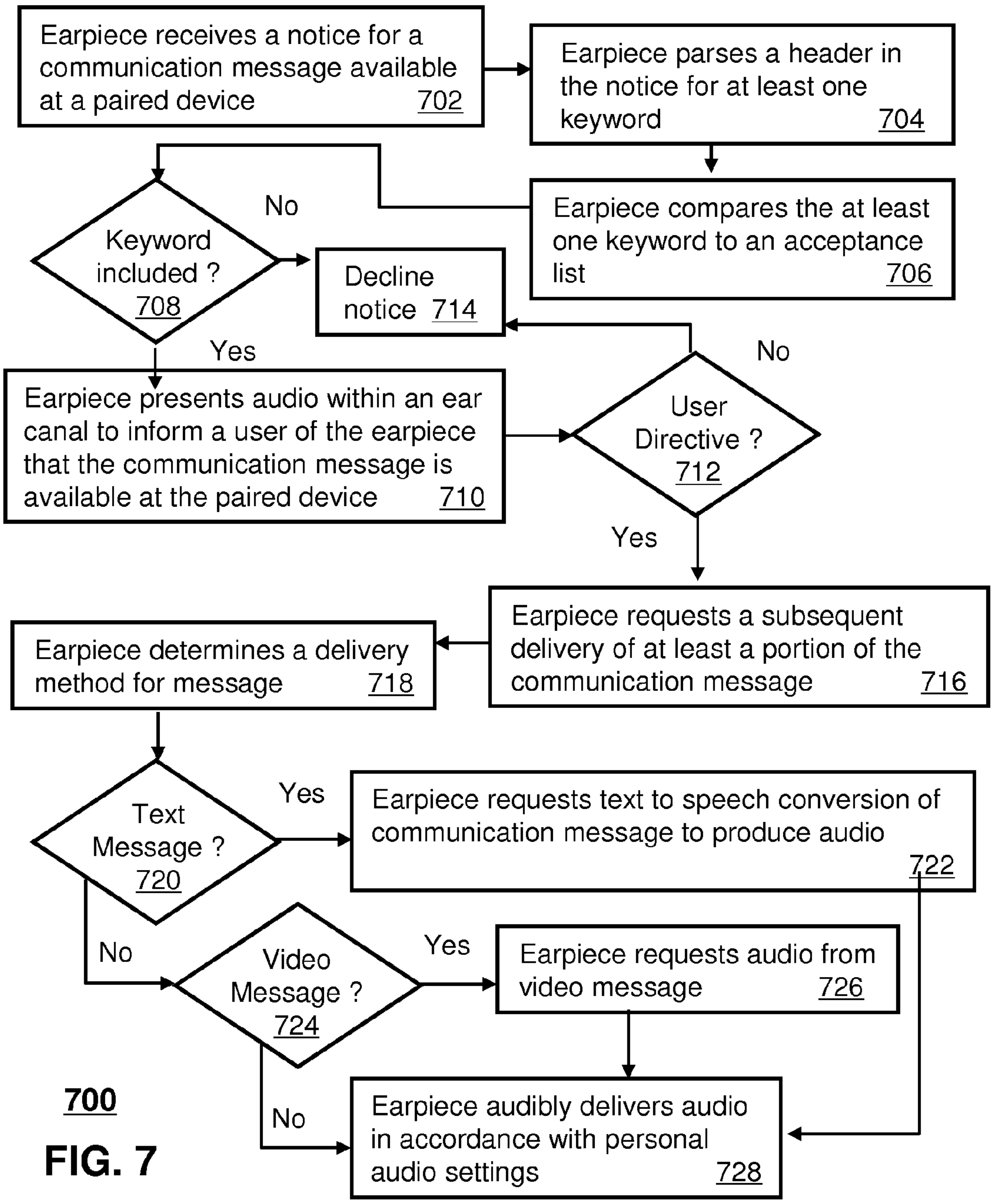
FIG. 7 is a flowchart of a method for a text message alert using an earpiece in accordance with an exemplary embodiment.

FIG. 7 is a flowchart of a method 700 for earpiece monitoring and warning detection in accordance with an exemplary embodiment. The method 700 can be practiced with more or less than the number of steps shown and is not limited to the order shown. To describe the method 700, reference will be made to the components of FIG. 2, although it is understood that the method 700 can be implemented in any other manner using other suitable components. The method 700 can be implemented in a single earpiece, a pair of earpieces, headphones, or other suitable headset audio delivery devices.

The method 700 can start in a state wherein the earpiece 100 has been inserted and powered on. It can also start in a state wherein the earpiece 100 has been paired or communicatively coupled with another communication device such as a cell phone or music media player. At step 702, the earpiece 100 receives a notice that a message is available at the communication device. The notice includes header information that identifies a content of the message received at the communication device. Although the notice can contain portions of the message, it does not transmit the entire message contents with the notice. Only identifier portions of the message are transmitted to the earpiece 100 by way of the notice at first. The message content can be transmitted at a time after the delivery of the notice.

Figure 8:
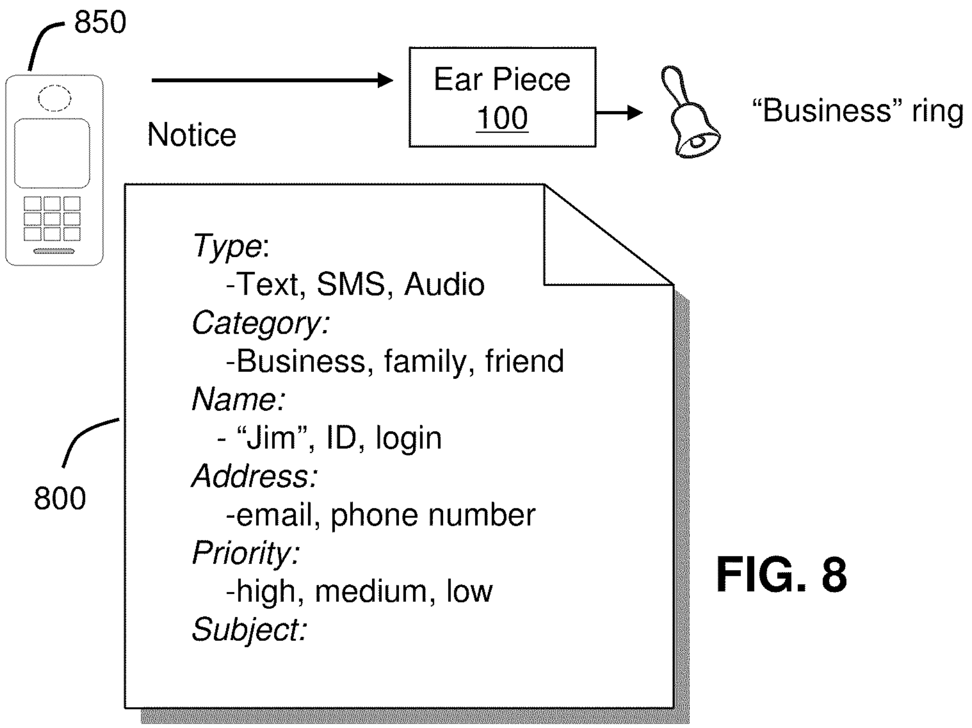
FIG. 8 is an illustration depicting receiving of a notice using an earpiece in accordance with an exemplary embodiment.

Referring to FIG. 8, an exemplary notice 800 is shown. In accordance with method 700 of FIG. 3, the notice 800 can be transmitted to the earpiece 100 upon receipt of a message from the communication device 850. (The earpiece 100 and the communication device 850 can operate with one or more network and infrastructure components to form a system.) The notice 800 can identify a type of the message as a text message, an audio message, or a video message, as well as formats of the message (e.g. .wav, mp3, etc.). The notice 800 can also identify a name, address, phone number, or priority (e.g., high, medium, low) of the message. For example, the Name attribute may identify the sender of the message, an intended recipients name, an ID, or login name. The notice 800 can also include at least a portion of a subject matter of the message, for instance, the subject field, or other information such as a date, timestamp, correspondence, follow-up, meeting, etc. The notice can also identify a category such as business, family, friend, or emergency.

Referring back to FIG. 7, at step 704 the earpiece parses the header in the notice for at least one keyword, and at step 706, compares at least one keyword, for example identifying a name or phone number, to an acceptance list. The acceptance list establishes whether the notice 800 will be communicated to a user wearing the earpiece 100. The acceptance list serves as a first interpreter to the message content to provide content screening before the user's attention is summoned.

Figure 9:
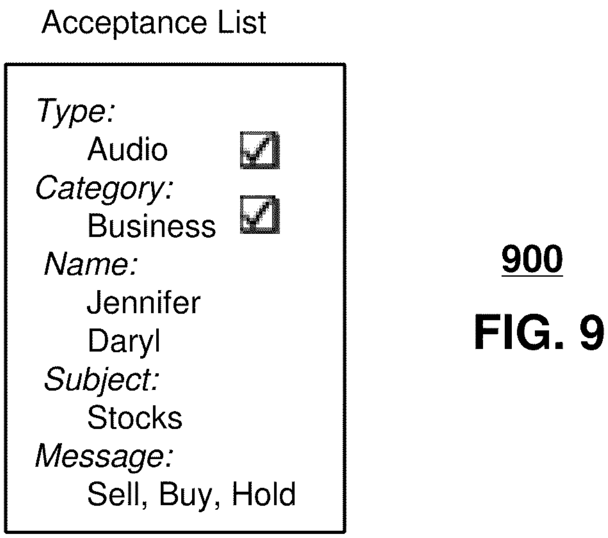
FIG. 9 is an acceptance list in accordance with an exemplary embodiment.

An exemplary acceptance list 900 is illustrated in FIG. 9. The acceptance list 900 can contain keywords which the user has pre-selected to determine which notices are audibly presented to the user. It should be noted that the user can also be provided an option to bypass the acceptance list and receive any and all communications from the paired device 850. A keyword can correspond to any text, word, phrase, number, or other symbol in the acceptance list 900. Although the acceptance list 900 can reside on the earpiece 100 during normal operation, it can also be stored on the communication device 850. This allows the communication device to perform the first level screening, and also allow the user to edit the acceptance list 900 on a display of the device. In other embodiments, the acceptance list 900 can be edited on the earpiece 100 via voice recognition commands.

As illustrated, the acceptance list 900 can include keywords for type (e.g. audio, video, text, etc.), category (e.g., business, family, friends, emergency, etc.), name (e.g., "Jennifer", ID, login), address (e.g. email address, IP address, SIP address, etc.), subject matter (e.g. "stocks"), and selected message keywords (e.g., "buy", "sell", etc.). Notably, the keywords within the acceptance list are used to determine whether the notice 900 will be used to get the user's audible attention. In such regard, the user, by updating and managing the acceptance list 900, can provide a pre-screening of content for authorizing. The earpiece pre-screens the notice before the user is audibly notified of the available message.

"Accept criteria" is established when at least one key word in the notice (or header) matches at least one keyword in the acceptance list 900. A matching function to detect the match can include Boolean operators (e.g. and, or, xor, etc.) or other string based parsers. At least one word or phrase in the header should match at least one word or phrase in the "Accept criteria" list. This "Accept criteria" list can be generated automatically by adding names and addresses from the user's electronic address book, or may be configured manually by the user entering words manually via the communication device 850.

Referring back to FIG. 7, if at step 708, a keyword in the notice 800 is not present in the acceptance list 900, the earpiece can decline the notice 800 as shown at step 714. For instance, the earpiece 100 can inform the communication device 850 by way of another message that the notice 800 was not audibly presented to the user. This can occur if no message attributes in the notice 800 match any of the keywords in the acceptance list 900. If however at step 708, the keyword in the notice 800 is present in the acceptance list 900, the earpiece 100 will proceed to inform the user of the availability of the message. Accordingly, at step 710, the earpiece 100 presents audio within an ear canal to inform a user of the earpiece that the message is available at the paired device. The audio can be a synthetic voice identifying the presence of the message or any keyword in the notice, an audible sound such as a music clip, speech clip, or sound clip, or any other audible representation.

In one arrangement, the earpiece 100 can play an audible sound in the ear canal that identifies the notice as being sent from family, friend, or business. The audible sound can also identify a priority of the message, for example, an emergency level. As one example, the audible sound can be a unique sound pattern such as a "bell" tone associated with a business message. Accordingly, the user, by way of a personal profile can assign sound patterns (e.g. ring tones, sound bites, music clips, etc.) to message attributes (e.g., category, name, phone number, SIP, IP, priority, etc.). The personal profile can be stored on the earpiece 100 or communication device 850 and can be presented to the user upon request, for example, for updating. In such regard, the user having assigned sound patterns can distinguish messages amongst senders without visually referring to the communication device 850.

Responsive to the earpiece 100 screening the notice, and audibly delivering the audio to the user, the earpiece can await a user directive. If at step 712, a user directive is received upon the user listening to the audible sound, the earpiece at step 716 requests a subsequent delivery of at least a portion of the message. The subsequent message can contain the content of the message (e.g. text message). The user directive can be a pressing of a button on the earpiece, or a voice recognition command spoken by the user. In the latter, for example, the processor 206 implements a speech recognition engine to check for voice commands within a time window after presenting the audible notification. If a voice command is not recognized or not heard within the time interval, or a physical interaction with the earpiece 100 is not detected, the earpiece 100 can decline the notice as shown in step 714. In such case, the earpiece 100 can inform the communication device 850 that the message was declined.

It should also be noted, that the user-directive can also request that the message be saved for later retrieval by the communication device 850. The earpiece can also recognize voice commands such as stop, start, pause, forward, rewind, speed up, or slow down, to change the delivery of the message content to the earpiece.

At step 718, the earpiece 100 determines a delivery method for the message. For instance, the earpiece 100 can query the communication device 850 for a content type or format and determine a suitable delivery means (e.g., IEEE 802.16x, Bluetooth, ZigBee, PCM, etc.) A preferred content format can also be presented in the notification 900. The earpiece 100 can also determine at this point if it can support the content format, or if, it needs the communication device 850 to perform a format conversion. For instance, at step 720, if it is determined that the message is in a text format, the earpiece can request text to speech conversion to produce audio at step 722. In such regard, the communication device 850 can convert the text message to speech and deliver the speech directly to the earpiece (e.g., wired/wireless). Alternatively, the earpiece 100 can perform text-to-speech conversion if the communication device 850 is not able to do so.

If, it is determined at step 724, that the message is in video format, the earpiece 100 can request audio from video message at step 726. For instance, a media player of the communication device 850 can separate audio streams from video streams, and send the audio stream only to the earpiece 100. If the message is already in an audio format, or upon request to convert to an audio format as shown in steps 720 and 724, the earpiece can audibly deliver audio to the user. As an example, the audio can be delivered in Pulse Modulation Code (PCM) format over a wired or wireless (e.g. Bluetooth) from the communication device 850 to the earpiece 100. The earpiece 100 can also deliver the audio in accordance with personal audio settings as shown in step 728. The audio settings can identify preferred volume levels for various content types (e.g., news, personal, business, advertisements, etc.).

Figure 10:
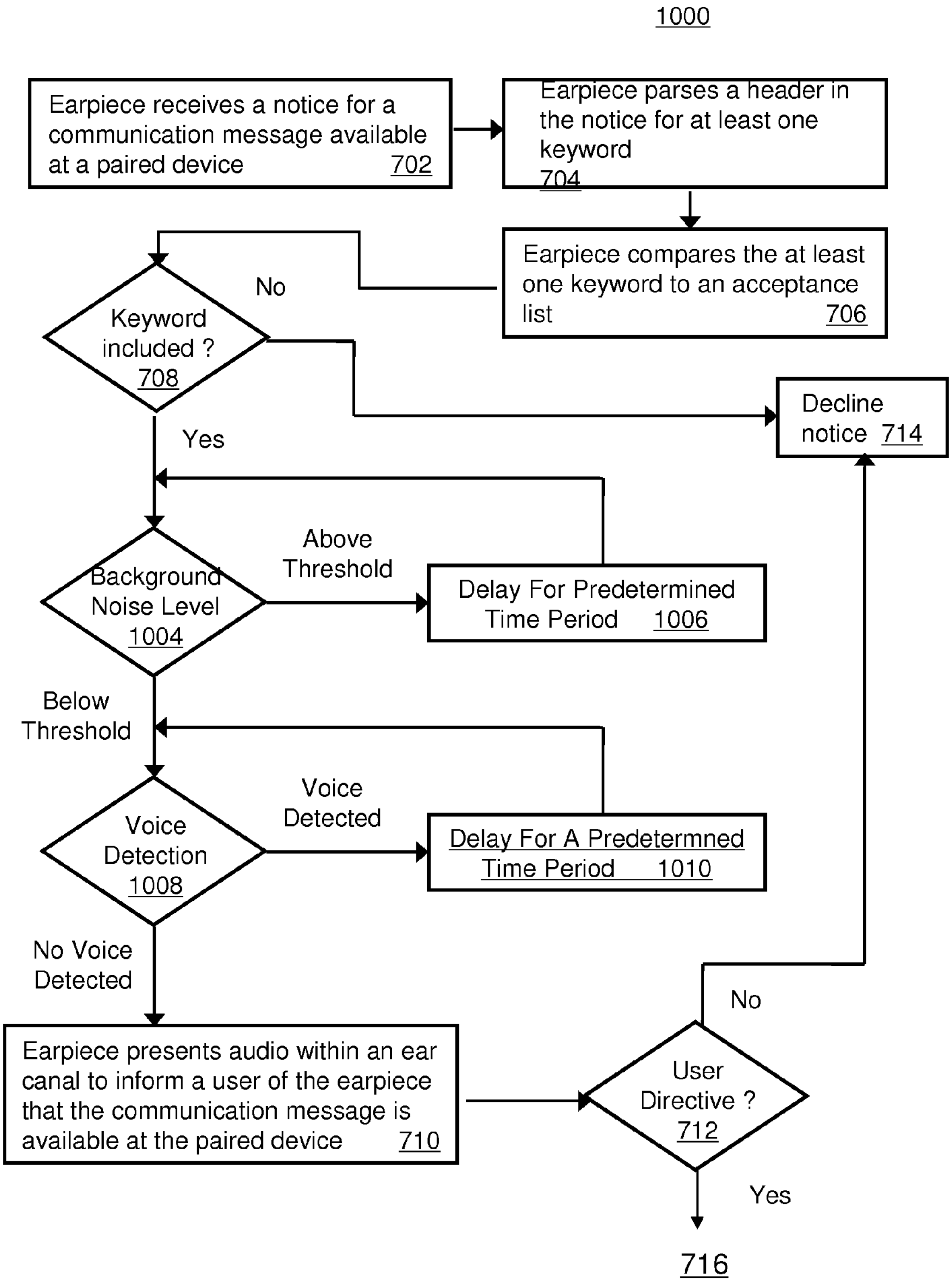
FIG. 10 is a flowchart of a method for adjusting when a message is delivered in accordance with an exemplary embodiment.

FIG. 10 is a flowchart of a method for adjusting when a message is delivered to a user in accordance with an exemplary embodiment. The method 1000 can be practiced with more or less than the number of steps shown and is not limited to the order shown and is related to FIG. 7 for providing a text message to an earpiece. In at least one exemplary embodiment, the adjustment occurs between the step 708 when a keyword has been identified and a step 710 when the user of the earpiece 100 is notified of the message. To describe the method 1000, reference will be made to the components of FIGS. 1 and 2, although it is understood that the method 1000 can be implemented in any other manner using other suitable components. The method 1000 can be implemented in a single earpiece, a pair of earpieces, headphones, or other suitable headset audio delivery devices.

In general, messaging can be a form of communication that results in numerous exchanges during the course of a day or night. The number of messages can greatly exceed other types of communications such as a phone call. It may be desirable or of benefit to inhibit or reduce the number of notifications that the user of earpiece 100 receives. Alternately, there can be conditions in which the user does not want to be disturbed or notified that messages have been received.

At step 702, the earpiece 100 receives the notice that a message is available at the communication device. As disclosed hereinabove, at step 704 the earpiece parses the header in the notice for at least one keyword, and at step 706, compares at least one keyword to an acceptance list. The acceptance list establishes whether the notice 800 will be communicated to the user wearing the earpiece 100.

Having met the acceptance list criteria (step 708), the background noise level is checked in a step 1004. ASM 110 provides a signal of the ambient environment around the user. Processor 206 calculates the background noise level from the ASM signal. In a first example, the background noise level measurement can be used to adjust the sound level of an audio queue provided to the user to indicate a message has been received. For example, under high background noise levels the sound level of the notification signal can be increased to ensure the user hears the prompt. Alternately, the processor 206 can select an alternate means of notification such as a haptic vibration. Earpiece 100 can then rely on the ECM 130 for receiving verbal commands or the physical controls on the paired devices.

Figure 11:
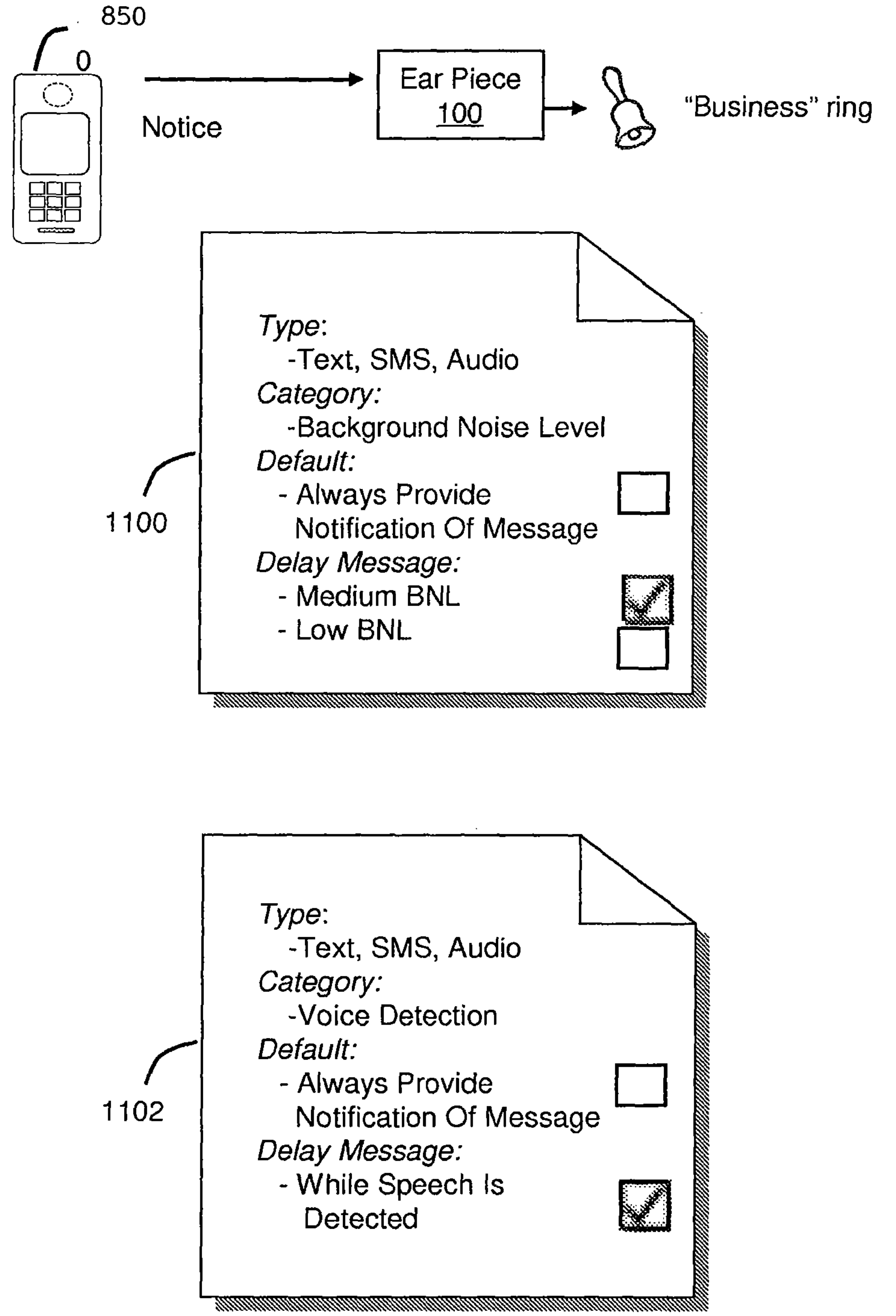
FIG. 11 is a background noise level list and a voice detection list in accordance with an exemplary embodiment.

In a second example, the background noise level above a predetermined level can trigger a delay in notification of a predetermined time period (e.g. 2 minutes) before a re-evaluation occurs. Referring to FIG. 11, a partial background noise level list 1100 is shown for handling conditions where the ambient noise level is high. The user can select the appropriate operating mode for earpiece 100 based on their need. As shown, notification that a message has been received is delayed when a medium background noise level (e.g. >70 dB) is detected by earpiece 100. Although the background noise level list 1100 can reside on the earpiece 100 during normal operation, it can also be stored on the communication device 850. This allows the communication device to edit the list 1100 on a display of the device 850. In other embodiments, the background noise level list 1100 can be edited on the earpiece 100 via voice recognition commands or connecting the device to a computer.

Referring back to FIG. 10, the background noise level is measured and compared to the user selected threshold in a step 1004. Providing notification of the message to the user is delayed for a predetermined time period in a step 1006 when the measured background noise level is greater than the threshold. The delay cycle will continue (background noise level is measured and found to be greater than the threshold) thereby preventing notification that a message was received until the background noise level falls below the threshold. Alternatively, there can also be a maximum delay time. The user of earpiece 100 is notified of the message after the maximum delay time even if the background noise level exceeds the predetermined level. The notification process continues when the background noise level is found to be below the threshold.

In a third example, an increase in background noise level can trigger the inflatable system 400 to raise the pressure within balloon 530 thereby increasing the attenuation level to ensure the notification can be heard in high ambient noise conditions. In one at least one exemplary embodiment, inflatable system 400 would increase or decrease attenuation to maintain an approximately constant noise level in ear canal 140 over a range of background noise levels. The lower end of the range corresponds to the minimum seal pressure of inflatable system 400 (that ensures the ear canal is sealed) and the upper end of the range corresponds to a maximum seal pressure for ensuring user comfort.

People often do not want to be interrupted when having a conversation. Detecting when the user of the device is speaking can be a trigger to prevent notification that a message has been received. The user of earpiece 100 can then continue the conversation without being distracted or interrupted by the device. In general, the notification of the message is delivered when the user has stopped talking. Referring to FIG. 11, is a partial voice detection list 1102 is shown for preventing notification while the user of the earpiece 100 is talking. The default mode is to always deliver notification of the message. The user can select the delay notification mode for earpiece 100 when desired. Although the voice detection list 1102 can reside on the earpiece 100 during normal operation, it can also be stored on the communication device 850. This allows the communication device 850 to edit the list 1102 on a display of the device 850. In other embodiments, the background noise level list 1102 can be edited on the earpiece 100 via voice recognition commands or connecting the device to a computer.

Voice detection is enabled in a step 1008 after the background noise level falls below the threshold. Processor 206 processes signals from ASM 110 and ECM 130 to determine if the user is speaking. In at least one exemplary embodiment, the notification is delayed for a predetermined time period (e.g. 30 seconds) in a step 1010. The process is repeated until no voice is detected (typically over a window of time). Other processes are contemplated such as continuously monitoring if the user is speaking or always recording the ASM 110 and ECM 130 in a cyclical buffer and analyzing the recorded information for user speech. The notification of the message is provided to the user in the step 710 if the user is not speaking. At step 710, the earpiece 100 presents audio within the ear canal to inform the user of earpiece 100 that the message is available at the paired device. The audio can be a synthetic voice identifying the presence of the message or any keyword in the notice, an audible sound such as a music clip, speech clip, or sound clip, or any other audible representation. A user directive in the step 712 determines whether the message is heard or not heard in respective steps 716 and 714. The adjustment for background noise level and voice detection are shown serially in the diagram. It is also anticipated that the checks can occur concurrently.

Figure 12:
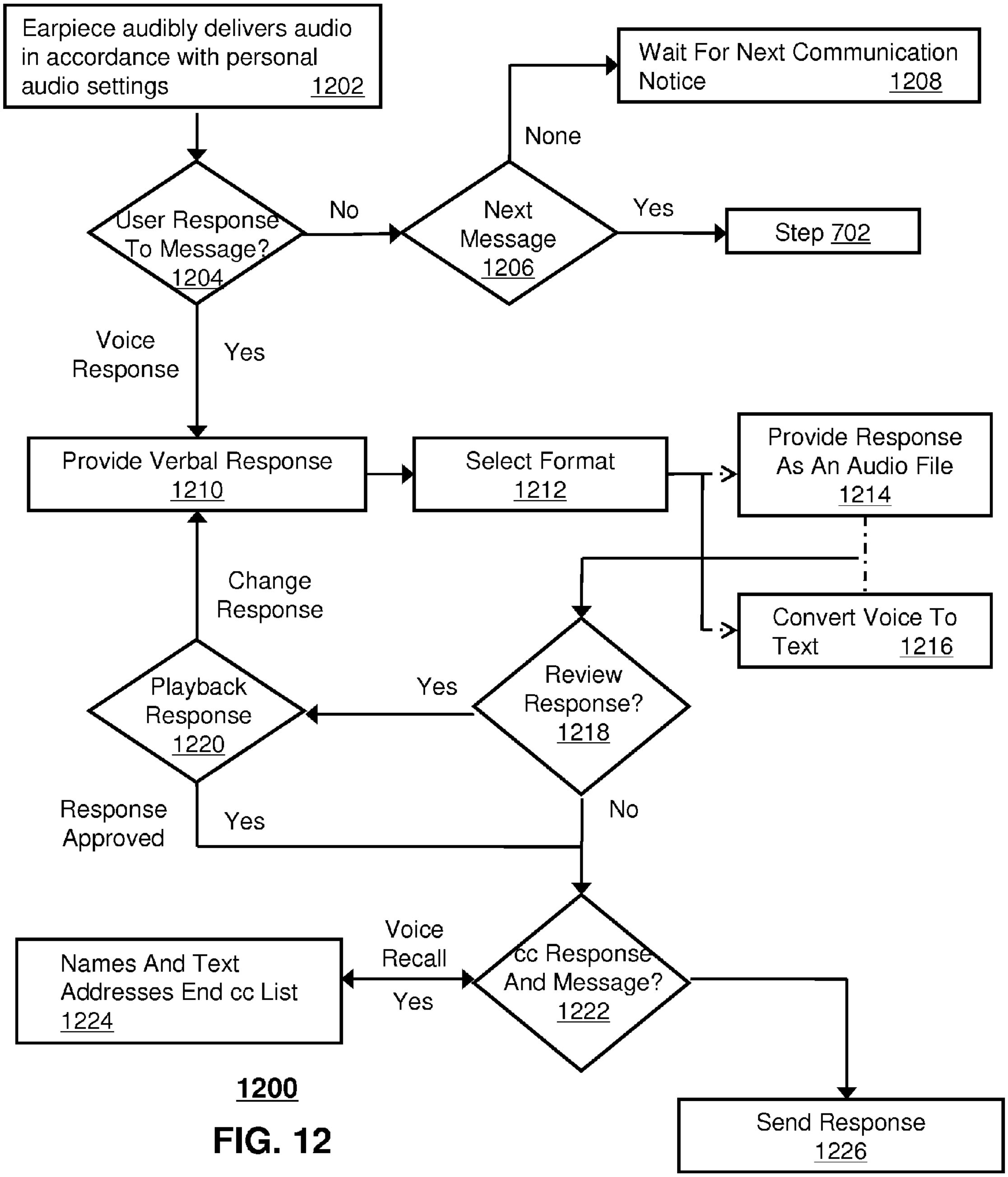
FIG. 12 is a flow chart of a method for responding to a message using an earpiece in accordance with an exemplary embodiment.

FIG. 12 is a flow chart of a method 1200 for responding to a message using an earpiece in accordance with an exemplary embodiment. As disclosed hereinabove, a user directive is received that requests a subsequent delivery of at least a portion of the message. Earpiece 100 delivers audio in accordance with personal audio settings in a step 1202. In one example a message can be an audio file such as a way or mp3 file that is delivered by earpiece 100. A text message is converted by processor 206 that converts the text message to speech and delivers the text in an audible synthesized voice.

The user has an option to respond or decline responding after hearing the message in a step 1204. This can be a verbal request, by touching a switch on earpiece 100, or using the screen/keys of communication device 850. The process of reviewing messages can continue in a step 1206 that reviews the next message in the queue. The process of FIG. 7 beginning with step 702 is started if a message is available and meets the criteria for notifying the user.

The system is on hold when no messages are in the queue in a step 1208. The system waits for an incoming message to be received by communication device 850 or another device that earpiece 100 is paired too. Receiving a message starts the process of FIG. 7 beginning with step 702.

In general, several options for responding to a message are available to the user of earpiece 100. In a first example, the user can reply to the message in a conventional manner such as texting. The user uses the keyboard of communication device 850 to text back a response. Texting can be a default response for the system since it is the most common response to a text. As mentioned above, there are times when texting is not convenient or could put the user in a hazardous situation. Driving a vehicle is one such situation where maintaining focus on the road and physical control of the automobile are essential for safety.

In at least one exemplary embodiment, earpiece 100 can request if the user wants to respond to the received message in a step 1204. For example, after a predetermined time period (after waiting for a text response) the earpiece provides a verbal response "would you like to respond verbally to the message?". A "yes" response by the user would put earpiece 100 in a mode for generating a response. Alternately, a verbal queue could be given by the user of earpiece 100 after hearing the message. For example, the user saying "verbal response" is recognized by processor 206 which enables the response mode. Also, earpiece 100 could automatically detect that the user has entered a vehicle via a Bluetooth or other wireless connection methodology with a vehicle. In at least one exemplary embodiment, earpiece 100 can disable texting (as a safety feature) when the user presence within an automobile is detected. Texting can be enabled by the user by verbal command, switch, or through the paired device (e.g. the user is not driving).

After responding "yes" in step 1204 to providing a voice response, the user can provide a verbal response that is recorded in a step 1210. In at least one exemplary embodiment, the response is recorded in memory. For example, a cyclical buffer can be used for temporarily storing information. The response by the user can be initiated by a tone or beep similar to that used in prior art message recording devices. The incoming voice response can be reviewed by processor 206 for an exit command to stop the recording process. For example, the user saying "end recording" can be recognized by processor 206 to stop recording. The recognized words "end recording" would not be stored in memory with the response. In at least one exemplary embodiment, the background noise level is monitored allowing processor 206 to adjust and mix the gains of ASM 110 and ECM 130 for recording the voice. ECM 130 is used principally when background noise levels are high to minimize noise and improve clarity of the recorded voice signal.

A format for sending the recorded message can be defaulted (e.g. voice or voice to text conversion), preselected, or selected by the user (e.g. verbal command). In at least one exemplary embodiment, the selection of the format in a step 1212 can be voice or text. In both cases the recorded response is used to reply to the message. In a step 1214, the response is selected to be sent as an audio file. The recorded response can be converted or compressed to a format that reduces the amount of information being sent such as a way or mp3 audio file. Alternately, the recorded response is provided to processor 206 and is converted from voice to text in a step 1216 using a voice to text program.

In at least one exemplary embodiment, the earpiece 100 requests if the user wants to review the response in a step 1218. If the user verbally responds to the affirmative (e.g. "yes") then the response is played back in a step 1220. In a first example, the audio file corresponding to the recorded response is played back to the user through earpiece 100. In a second example, the response was converted to text. Processor 206 can convert the text being sent back to speech and playback the text response using a synthesized voice through earpiece 100. The user can approve or disapprove of the response after hearing the response (text or voice). For example, after playback of the response the earpiece 100 asks the user "would you like send the response?". By responding to the affirmative (e.g. "yes") the user can move towards sending the response to the message. Similarly, in step 1218, the user can respond to the negative (e.g. "no") to the review process entirely and move towards sending the response to the message. Conversely, the user responding to the negative or disapproving of the response can go back to step 1210 and record a new response in lieu of the one previously recorded. In at least one exemplary embodiment, the user can use a verbal command (e.g. "No Response") or hit a button on the earpiece to stop the response process.

In a step 1222, the user has an option to carbon copy the response to others. Earpiece 100 asks if the user wants to carbon copy (cc) the message to others. The user vocally responds to the affirmative that he/she wants to cc the response to other people. In at least one exemplary embodiment, the user then states a name to cc. The processor 206 identifies the name from a list residing on earpiece 100 or device 850 and tags the address to the response in a step 1224. In at least one exemplary embodiment, earpiece 100 will reply by repeating the name (optionally the address) found on the list. The user can verbally confirm or decline the name found by processor 206. If the user declines the address, processor 206 will not tag the address to the response. Earpiece 100 will then request whether the user wants to cc another person. An affirmative response continues the process of adding others to list of people to send the response to. A negative response moves the user to send a response in a step 1226. For example, the user can verbally end the process by stating a phrase such as "No More Addresses". Similarly, in step 1222 the user can provide a negative response to the query from earpiece 100 to carbon copy others and move to send a response in the step 1226. In the step 1226, earpiece 100 requests if the user wants to send the response to the message. Answering to the affirmative sends the message (including cc's) as an audio file or a voice message that was converted to text. Answering to the negative prevents sending the response and provides the user with the option of providing another verbal response (step 1210) or reviewing the next message (step 1206). Thus, a handsfree process or a process that minimizes user physical interaction with a keyboard device has been provided that allows the user to review and respond to messages in a safe manner.

Figure 13:
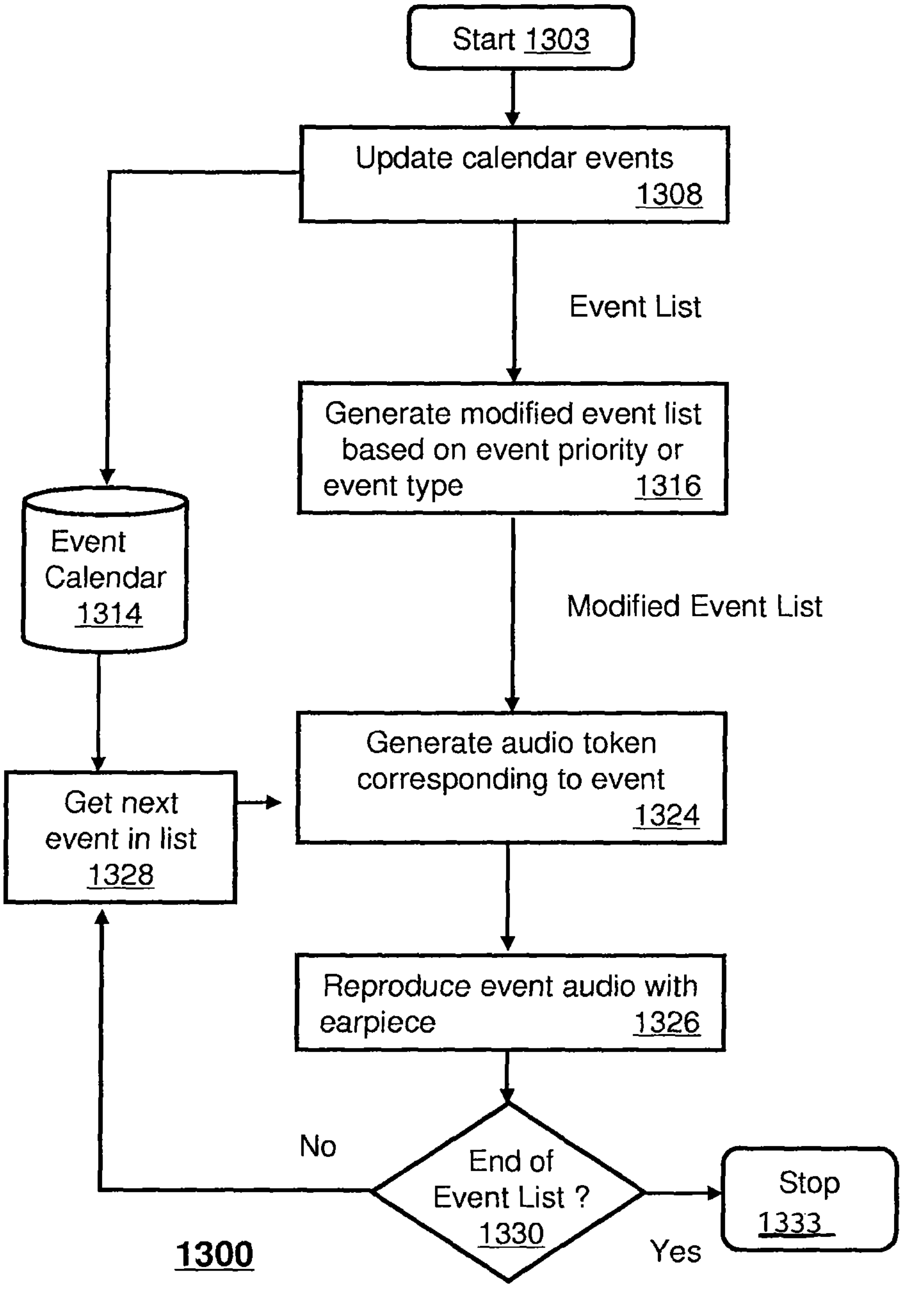
FIG. 13 is a flow chart of a method for administering an audio message to an earpiece in accordance with an exemplary embodiment.

FIG. 13 is a flow chart of a method 1300 for administering an audio message using an earpiece in accordance with an exemplary embodiment. Briefly, the earpiece screens the event information according to acceptance criteria, produces a modified event list in response to the screening, and audibly inform a user wearing the earpiece of the modified event information. The method for "EarMinder" (i.e., reminder) can start at step 1303.

At step 1308 the earpiece 100 updates calendar events from a calendar database system 1314. The calendar may be stored on the earpiece, the paired communication device, or on a remote server and retrieved via transceiver 204 (see FIG. 2). Examples of remote calendar database systems are computer readable data storage devices such as Personal digital assistants (PDAs); computing devices; and telephone devices. In particular, the earpiece, responsive to the screening, updates a personal event calendar and generates a first event list from the event information received from paired communication device. The updated personal event calendar comprises at least an event name and the time of that event, and in some exemplary embodiments, the location, category, importance and people who are attending the event. These event details are stored on computer readable memory in the earpiece 100 or the paired communication device.

For example, the user may enter into the paired communication device an event, such as a birthday, in their calendar and name the event such as "Patrick's Birthday Party". The earpiece can then query the paired communication device for this event information in the calendar, as well as other event information. As another example, the user may receive an electronic invitation or reminder for "Sally's Birthday" and upon reading the electronic invitation commit the event to the personal calendar.

Returning back to FIG. 13, at step 1316, the earpiece generates a modified event list based on event priority or event type. For example, the earpiece converts the first event list to the modified event list by ordering events in order of importance. The modified list priority can be set manually by the user, or may be associated with each event as a "meta tag". The conversion can also include collectively grouping together similar events. During the grouping of events, less important events can be removed until a total number of remaining events is equal to a predetermined threshold. Events which have incomplete data fields or an unacceptable language description can also be removed. The earpiece can convert the first event list to the modified event list by ordering the events by a time at which the event is planned to occur, by grouping events according to a geographic location at which the event is planned, or by grouping events according to an event category.

With regard to the previous example, for instance, as the birthday approaches, the user may receive text messages from numerous people also attending Patrick's Birthday asking the user if he or she plans on attending. They may do this in order to make plans together. Instead of the user replying to each text message on the common event, the earpiece screens the incoming text messages for this event information and collects text messages related to the event. The earpiece then compiles the content of the text messages related to the inquiry, as well as the people submitting the inquiry, into a collective event and informs the user of the common request; that is, whether the user plans on attending the party.

Returning back to FIG. 13, at step 1324 the earpiece generates an audio token corresponding to the event. In particular, the earpiece generates the audio token for collective events in the modified event list for audible delivery to the ear canal responsive to generating the modified event list by grouping events in the first event list according to acceptance criteria based on event priority of event types. The process of converting the event into a corresponding audio token can include converting one of the text data fields into a corresponding speech audio message using a text to speech converter, or associating at least one of the data fields with a non-speech audio signal, such as a tone of different pitch for different event categories, and reproducing this non-speech audio signal after the speech message. The method step can further include converting a text data field in the event information into a corresponding speech audio message by way of a text to speech converter, and associating the data field in the event information with a non-speech audio signal, such as a tone of different pitch for different event categories, and reproducing the non-speech audio signal after the speech message.

At step 1326, the corresponding audio token is then reproduced with the loudspeaker (ECR 120, see FIG. 1) of the earpiece, and if decision unit 1330 determines that the last event in the event list has not been reported to the user, then the next event in the list is obtained 1328 and the corresponding audio token generated 1324 and reproduced again at 1326. The audio token may be reproduced just once, or at predetermined times related to the event time (e.g. 1 hour warning, 15 minute warning). In some exemplary embodiments, only the non-speech audio signal is reproduced after the speech message has been reproduced once.

Continuing with the previous example, the earpiece can generate an audible message played to the user indicating, for example, that five people have text messaged “you” (the user), and want to know if “you” will be attending Patrick’s Birthday Party. The earpiece, upon receiving a voice command from “you” (the user), can proceed to announce each of the people requesting “your” attendance information. The earpiece upon receiving the user’s response can then automatically send a response message to each of the requesting parties indicating whether the user will attend or not. In such regard, the user need only hear a collected message inquiry, namely, whether they will attend, and then respond with a single reply that is sent to each of the people. The user does not need to listen to each message and respond individually since by way of the method 1300 in FIG. 13 can collectively respond to the common event information.

During audio playback, the earpiece can reduce a volume of audio content generated by the ECR 120 to a predetermined level for allowing the audio token to be heard clearly; and increase a volume of the audio token in accordance with an importance or priority level of the event information associated with the audio token. Moreover, the earpiece by way of the processor 206 can monitor an ambient background noise level and an internal ear canal noise level, and adjust a sealing section of the earpiece to attenuate background noise levels passing from the ambient environment to the ear canal to permit clear reproduction of the audio token.

For instance, in the continuing example, the earpiece can determine if the user is in a loud environment, and delay the playing of the audio token until the ambient environment noises subside. Alternatively, the earpiece can actively reduce a level of ambient environment that is passed through to the ear canal to permit the user to hear the audio token. For example, at one extreme, the earpiece can turn off the ASM 110 such that only the ECR audio is heard. In another arrangement, the earpiece can further inflate the balloon 530 of the earpiece seal to provide further ambient sound attenuation. Moreover, the earpiece can perform such actions based on a priority.

As shown in steps 1324 to 1330 of FIG. 13, the method 1300 can continue to loop through the modified event list and generate an audio token according to event priority and event type. Upon reaching the end of the list at step 1330, the method can stop at step 1333. The method 1300 can automatically re-activate upon receiving new text messages or updates in the personal event calendar 1314.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A method for administering an audio message to a user of an earpiece, the method comprising the steps of:

receiving event information from a paired communication device;

screening the event information to generate an event list;

grouping multiple events in the event list having similar event information into at least one collective event and forming modified event information for the at least one collective event; and generating the audio message including the modified event information for the at least one collective event, to audibly inform the user of the modified event information via an Ear Canal Receiver (ECR) of the earpiece, wherein the audio message includes a speech audio message and a non-speech audio signal, the generating of the audio message including converting at least one text data field in the modified event information into the speech audio message and associating at least one data field in the modified event information with the non-speech audio signal.

2. The method of claim 1, comprising:

updating a personal event calendar to generate the event list from the event information; and generating a modified event list according to an acceptance criteria based on an event priority of event types.

3. The method of claim 2, wherein the step of updating comprises:

ordering events in an order of importance, by an event occurrence time, or according to an event category.

4. The method of claim 2, wherein the step of updating comprises:

ordering events by an event name, an event location, or an event invite.

5. The method of claim 2, wherein the step of generating comprises:

removing events which have an event importance lower than a predetermined criteria threshold until a total number of remaining events is equal to a predetermined threshold.

6. The method of claim 2, wherein the step of generating comprises:

grouping events by an event location.

7. The method of claim 2, wherein the step of generating comprises:

grouping events by an event category.

8. The method of claim 2, wherein the step of generating comprises:

removing events which have incomplete data fields.

9. A method for administering an audio message to a user of an earpiece, the method comprising the steps of:

receiving event information from a paired communication device;

updating a personal event calendar by ordering the event information to generate an event list;

grouping multiple events in the event list having similar event information into at least one collective event and forming modified event information for the at least one collective event; and generating the audio message including the modified event information for the at least one collective event for audible delivery to an ear canal via an Ear Canal Receiver (ECR) of the earpiece, wherein the audio message includes a speech audio message and a non-speech audio signal, the generating of the audio message including converting at least one text data field in the modified event information into the speech audio message and associating at least one data field in the modified event information with the non-speech audio signal.

10. The method of claim 9, further comprising:

reducing a volume of audio content generated by the ECR to a predetermined level for increasing an audibility of the audio message; and increasing a volume of the audio message in accordance with an importance level or a priority level of the modified event information associated with the audio message.

11. The method of claim 9, further comprising:

monitoring an ambient background noise level of an ambient environment and an internal ear canal noise level; and adjusting a sealing section of the earpiece to attenuate the ambient background noise level passing from the ambient environment to the ear canal to permit reproduction of the audio message.

12. The method of claim 9, wherein the step of grouping comprising:

ordering events by an event name, an event location, an event data, an event importance, an event invite, or an event category; and grouping the multiple events according to the ordering to form the at least one collective event.

13. The method of claim 9, the method comprising:

reproducing the non-speech audio signal after the speech audio message.

14. The method of claim 9, the method comprising:

generating a modified event list according to an acceptance criteria based on an event priority of event types, the modified event list being used to group the multiple events.

15. The method of claim 9, wherein the non-speech audio signal includes a tone, the tone having a different pitch for different event categories.

16. An earpiece, comprising:

an Ear Canal Receiver (ECR) to deliver audio to an ear canal;

a transceiver to receive and transmit event information from a paired communication device; and a processor operatively coupled to the transceiver and the ECR, the processor configured to:

screen the event information to generate an event list, group multiple events in the event list having similar event information into at least one collective event and form modified event information for the at least one collective event, and generate an audio message including the modified event information for the at least one collective event, to audibly inform a user wearing the earpiece of the modified event information via the ECR, wherein the audio message includes a speech audio message and a non-speech audio signal, the processor configured to convert at least one text data field in the modified event information into the speech audio message, and to associate at least one data field in the modified event information with the non-speech audio signal.

17. The earpiece of claim 16, wherein the processor responsive to the screening updates a personal event calendar.

18. The earpiece of claim 16, wherein the event information comprises a data field that is at least one among an event name, an event location, an event importance, an event invitation list, and an event category.

19. The earpiece of claim 16, wherein the processor removes events from the event list which have incomplete data fields or an unacceptable language description.

20. The earpiece of claim 16, wherein the earpiece includes an Ambient Sound Microphone (ASM) to capture ambient sound and the processor delays notifying the user of the audio message until a background noise level monitored by the ASM falls below a predetermined threshold.

21. The earpiece of claim 1, wherein the processor reduces a volume of audio content generated by the ECR to a predetermined level to increase an audibility of the audio message.

22. The earpiece of claim 1, wherein the earpiece includes an Ambient Sound Microphone (ASM) to capture ambient sound in an ambient environment and an Ear Canal Microphone (ECM) to monitor a sound pressure level (SPL) within the ear canal, and wherein the processor monitors the ASM and the ECM, and adjusts a sealing section of the earpiece to attenuate background noise levels passing from the ambient environment to the ear canal.

23. The earpiece of claim 1, wherein the event information is included in a message received from the paired communication device.

24. The earpiece of claim 1, wherein the processor converts the event list to a modified event list according to a predetermined criteria, the modified event list being used to group the multiple events.

25. The earpiece of claim 24, wherein the processor converts the event list to the modified event list by ordering events by an event occurrence time.

26. The earpiece of claim 24, wherein the processor converts the event list to the modified event list by grouping events according to geographic locations of the events.

27. The earpiece of claim 24, wherein the processor converts the event list to the modified event list by grouping events according to an event category.

28. The earpiece of claim 24, wherein the processor converts the event list to the modified event list by ordering events in an order of importance.

29. The earpiece of claim 28, wherein the processor converts the event list to the modified event list by removing less important events until a total number of remaining events is equal to a predetermined threshold.

* * * * *